United States Patent
Yu et al.

(10) Patent No.: US 9,018,847 B2
(45) Date of Patent: Apr. 28, 2015

(54) THYRISTOR DIMMING CIRCUIT WITH LOSSLESS DISCHARGING CIRCUIT AND METHOD THEREOF

(71) Applicant: Silergy Semiconductor Technology (Hangzhou) Ltd, Hangzhou, Zhejiang Province (CN)

(72) Inventors: Feng Yu, Hangzhou (CN); Xiaodong Huang, Hangzhou (CN)

(73) Assignee: Silergy Semiconductor Technology (Hangzhou) Ltd., Hangzhou (CN)

( * ) Notice: Subject to any disclaimer, the term of this patent is extended or adjusted under 35 U.S.C. 154(b) by 56 days.

(21) Appl. No.: 14/044,422

(22) Filed: Oct. 2, 2013

(65) Prior Publication Data
US 2014/0139129 A1     May 22, 2014

(30) Foreign Application Priority Data
Nov. 20, 2012    (CN) .......................... 2012 1 0477319

(51) Int. Cl.
    *H05B 33/08*      (2006.01)
(52) U.S. Cl.
    CPC ........ *H05B 33/0815* (2013.01); *H05B 33/0845* (2013.01)

(58) Field of Classification Search
    USPC .......... 315/200 R, 206, 209 R, 291, 307, 308; 363/21.12–21.18
    See application file for complete search history.

(56) References Cited

U.S. PATENT DOCUMENTS

| | | | |
|---|---|---|---|
| 7,649,327 B2 * | 1/2010 | Peng | 315/312 |
| 2013/0169177 A1 * | 7/2013 | Liao et al. | 315/200 R |

* cited by examiner

Primary Examiner — Jimmy Vu
(74) Attorney, Agent, or Firm — Michael C. Stephens, Jr.

(57) ABSTRACT

Thyristor dimming circuits and methods are disclosed herein. In one embodiment, a thyristor dimming circuit can include: (i) a thyristor and a rectifier bridge configured to receive a sinusoidal AC voltage, and to generate a phase-loss input voltage; (ii) a power stage circuit configured to have the phase-loss input voltage applied thereto, the power stage circuit having a main switch and being configured to drive a lamp load through electrical conversion; and (iii) a discharging circuit configured, during a first predetermined time interval, to control the main switch to operate with a fixed duty cycle at a fixed frequency, where the first predetermined time interval begins prior to an absolute value of the sinusoidal AC voltage being reduced to zero, the first predetermined time interval ending when the phase-loss input voltage is again applied to the power stage circuit.

10 Claims, 7 Drawing Sheets

FIG. 1 (conventional)

FIG. 2 (conventional)

THYRISTOR DIMMING CIRCUIT WITH LOSSLESS DISCHARGING CIRCUIT AND METHOD THEREOF

RELATED APPLICATIONS

This application claims the benefit of Chinese Patent Application No. 201210477319.4, filed on Nov. 20, 2012, which is incorporated herein by reference in its entirety.

FIELD OF THE INVENTION

The present invention relates to the field of power electronics, and more particularly to thyristor dimming circuits and methods.

BACKGROUND

Figure 1:
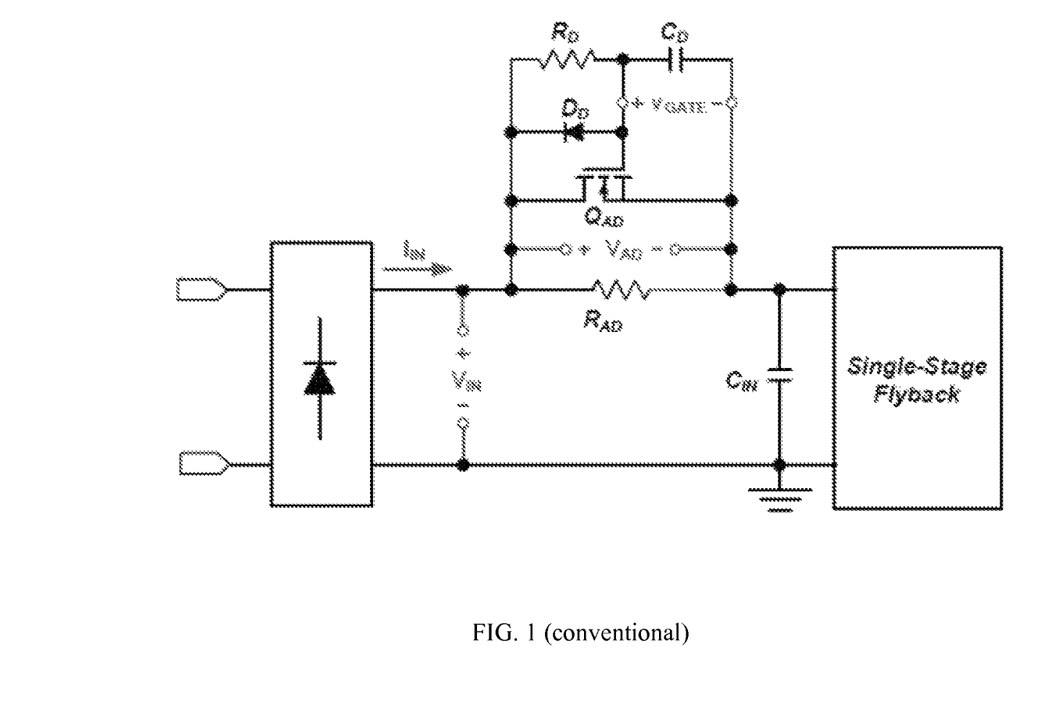
FIG. 1 is a schematic block diagram of a first example conventional discharging circuit.

In order to ensure normal operation of a thyristor circuit, a discharging circuit can be included to provide a current charge loop for the thyristor circuit. As shown in FIG. 1, a conventional common active discharging circuit can include a resistor, a capacitor, a diode, a switch, and so on. However, this particular circuit structure is relatively complex with high product costs and power losses. In another discharging circuit of FIG. 2, resistor $R_B$ and capacitor $C_B$ can be series connected between a bus voltage and ground. This discharging circuit structure is relatively simple with few components. However, power losses resulting in high power consumption can occur due to the discharging circuit being always connected between the bus voltage and ground.

SUMMARY

In one embodiment, a thyristor dimming circuit can include: (i) a thyristor and a rectifier bridge configured to receive a sinusoidal AC voltage, and to generate a phase-loss input voltage; (ii) a power stage circuit configured to have the phase-loss input voltage applied thereto, the power stage circuit having a main switch and being configured to drive a lamp load through electrical conversion; and (iii) a discharging circuit configured, during a first predetermined time interval, to control the main switch to operate with a fixed duty cycle at a fixed frequency, where the first predetermined time interval begins prior to an absolute value of the sinusoidal AC voltage being reduced to zero, the first predetermined time interval ending when the phase-loss input voltage is again applied to the power stage circuit.

In one embodiment, a thyristor dimming method can include: (i) generating a phase-loss input voltage from a sinusoidal AC voltage by a thyristor and a rectifier bridge; (ii) driving a lamp load through electrical conversion of the phase-loss input voltage by a power stage circuit; and (iii) during a first predetermined time interval, controlling a main switch of the power stage circuit to operate with a fixed duty cycle at a fixed frequency, the first predetermined time interval beginning prior to the absolute value of the sinusoidal AC voltage being reduced to zero, the first predetermined time interval ending when the phase-loss input voltage is again applied to the power stage circuit.

Embodiments of the present invention can provide several advantages over conventional approaches, as may become readily apparent from the detailed description of preferred embodiments below.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

FIG. 1 shows a schematic block diagram of a first example conventional discharging circuit. In this example, the power stage circuit can be configured as a single-stage flyback converter. Typically, a current charge loop is utilized for a thyristor circuit in order to ensure normal circuit operation. In this example, the discharging circuit can include resistor $R_D$, capacitor $C_D$, diode $D_D$, switch $Q_{AD}$, and so on. A thyristor or a silicon-controlled rectifier (SCR) is a solid-state semiconductor device that can include four layers of alternating N and P-type material. Thyristors may act as bistable switches, conducting when the thyristor gate receives a current trigger, and continuing to conduct while being forward biased.

Figure 2:
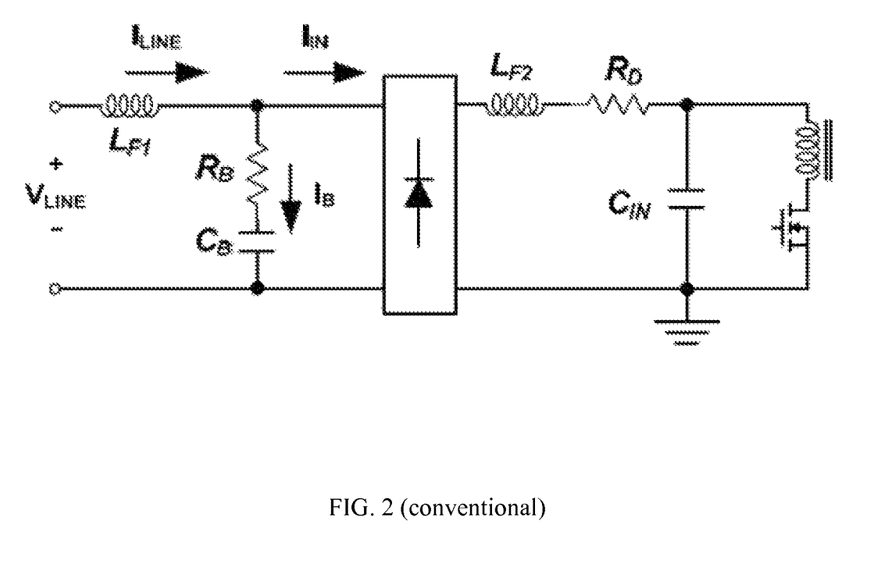
FIG. 2 is a schematic block diagram of a second example conventional discharging circuit.

FIG. 2 shows an alternate discharging circuit with a series connection of resistor $R_B$ and capacitor $C_B$ between a bus voltage and ground. Even though this circuit example has a relatively simple structure, power losses and excessive power consumption can occur due to the series connection with resistor $R_B$ being connected to the bus voltage.

In particular embodiments, a thyristor dimming circuit may have a lossless discharging circuit that can discharge current by controlling operation of a main switch during predetermined time intervals. This particular thyristor dimming circuit may have a relatively simple structure by utilizing a discharge circuit to control the main switch, instead of using an extra discharge switch. In addition, the discharging circuit of particular embodiments may not increase power consumption during the discharging process.

In one embodiment, a thyristor dimming circuit can include: (i) a thyristor and a rectifier bridge configured to receive a sinusoidal AC voltage, and to generate a phase-loss input voltage; (ii) a power stage circuit configured to have the phase-loss input voltage applied thereto, the power stage circuit having a main switch and being configured to drive a lamp load through electrical conversion; and (iii) a discharging circuit configured, during a first predetermined time interval, to control the main switch to operate with a fixed duty cycle at a fixed frequency, where the first predetermined time interval begins prior to an absolute value of the sinusoidal AC voltage being reduced to zero, the first predetermined time interval ending when the phase-loss input voltage is again applied to the power stage circuit.

Figure 3:
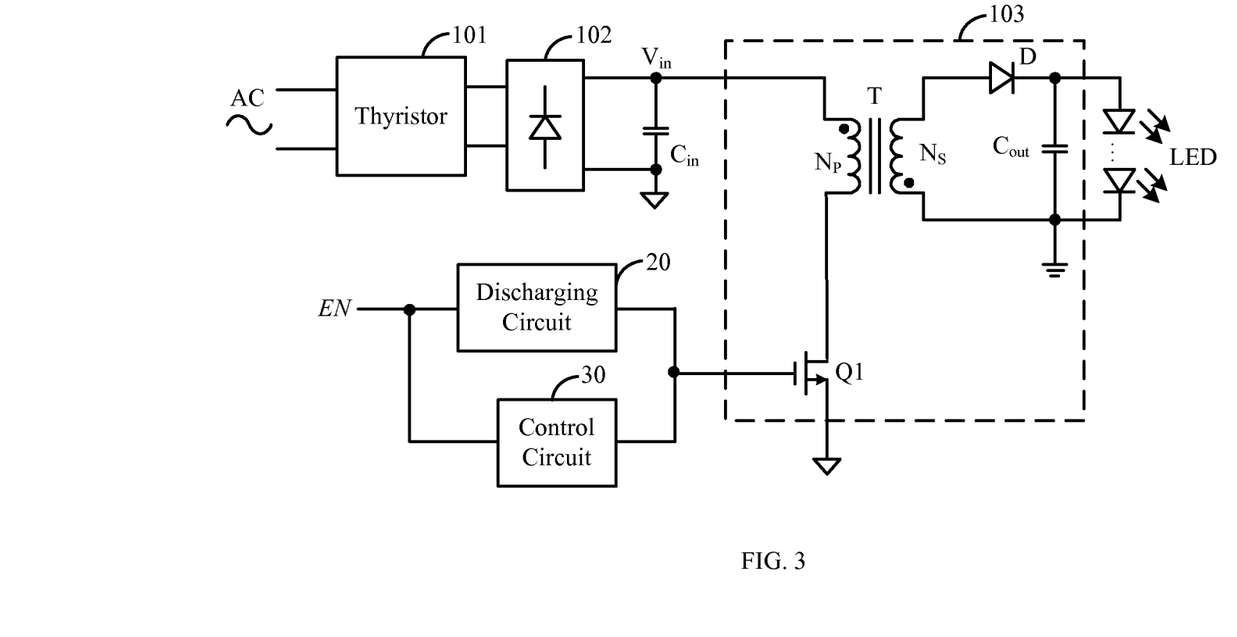
FIG. 3 is a schematic block diagram of a first example thyristor dimming circuit in accordance with embodiments of the present invention.

Referring now to FIG. 3, shown is a schematic block diagram of a first example thyristor dimming circuit in accordance with embodiments of the present invention. In this example, the power stage circuit can be configured as a single-stage flyback converter. However, other topologies (e.g., buck, Sepic, buck-boost, etc.) or arrangements can also be employed for power stages in particular embodiments. The thyristor dimming circuit in this example can include thyristor 101, rectifier bridge 102, power stage circuit 103, discharging circuit 20, and control circuit 30. Thyristor 101 can include one or more thyristors or SCRs therein. Thyristor 101 and rectifier bridge 102 can be used to generate a phase-loss input voltage $V_{in}$ after processing a sinusoidal AC voltage by thyristor 101 and rectifier bridge 102. Power stage circuit 103 can be used to drive a lamp load (e.g., one or more light-emitting diodes [LEDs]) through electrical (e.g., voltage) conversion by power stage circuit 103.

Phase-loss input voltage $V_{in}$ can be applied to power stage circuit 103, and control circuit 30 can control main switch Q1 in power stage circuit 103. Main switch Q1 can be used to generate, via power stage circuit 103, a certain current (e.g., a substantially constant current) for driving a lamp load (e.g., LED). This can occur until a moment prior to the input current of power stage circuit 103 being reduced to a level of a maintaining or holding current of thyristor 101. A holding current is a minimum current to provide a path between anode and cathode to maintain a thyristor in the on state.

A second predetermined time interval can end at a moment before the absolute value of the sinusoidal AC voltage is reduced to zero. During the second predetermined time interval, power stage circuit 103 may be disabled, and the input voltage can be maintained at substantially the value that it had at the beginning of the second predetermined time interval due to input capacitor $C_{in}$. Thus, the load current can be higher than the holding current of thyristor 101 that occurs during the conduction time or on state of thyristor 101. In this way, possible LED flashing or flickering that might otherwise be caused by mis-conduction, or inadvertent turn off/on, of thyristor 101 can be substantially avoided.

When the second predetermined time interval ends, a first predetermined time interval can begin. During the first predetermined time interval, discharging circuit 20 can control main switch Q1 in power stage circuit 103 to operate with, e.g., a fixed duty cycle at a fixed frequency. This can provide a current charging loop for thyristor 101 to ensure the thyristor turns on successfully before a next dimming cycle arrives. This can occur until phase-loss input voltage $V_{in}$ is again applied to power stage circuit 103 (e.g., when input voltage $V_{in}$ is sufficient to provide current to transformer T and/or main switch Q1 is on), when the first predetermined time interval ends. The discharging circuit can control the fixed frequency of main switch Q1 in power stage circuit 103 in order to minimize switching frequency and power consumption.

In a thyristor dimming circuit of particular embodiments, the power stage circuit can operate in at least three phases of operation. In a first predetermined time interval, the power stage circuit can be controlled to operate with fixed duty cycle at fixed frequency by discharging circuit 20. For example, the first predetermined time interval can begin at a moment before the absolute value of the sinusoidal AC voltage is reduced to zero, and may end at a moment when phase-loss voltage $V_{in}$ is again applied to power stage circuit 103. In a second predetermined time interval, power stage circuit 103 may be disabled. For example, the second predetermined time interval may begin at a moment before the input current of power stage circuit 103 is reduced to the holding current of thyristor 101, and may end at the beginning of the first predetermined time interval. Thus, the first and second predetermined time intervals may be substantially adjacent in time. Also, power stage circuit 103 may operate normally under the control of control circuit 30 from a moment when phase-loss input voltage $V_{in}$ begins to be applied to power stage circuit 103 to a beginning of the second predetermined time interval.

In addition, both discharging circuit 20 and control circuit 30 can receive enable signal EN. For example, enable signal EN can be utilised during the second time interval to disable discharging circuit 20 and/or control circuit 30, in order to facilitate control of the operation timing of power stage circuit 103. Those skilled in the art will recognize that other types of enable-based control (e.g., other control signals, bit strings, etc.) may alternatively be used to enable or disable discharging circuit 20 and/or control circuit 30.

In particular embodiments, a thyristor dimming circuit can discharge electrical energy (e.g., charge, current, etc.) by controlling operation of main switch Q1 through a lossless discharging circuit 20. In this way, an independent discharging circuit may not be needed, and the overall circuit structure can be simplified. Moreover, power consumption can be reduced during the discharging process, as compared to conventional approaches.

Figure 4:
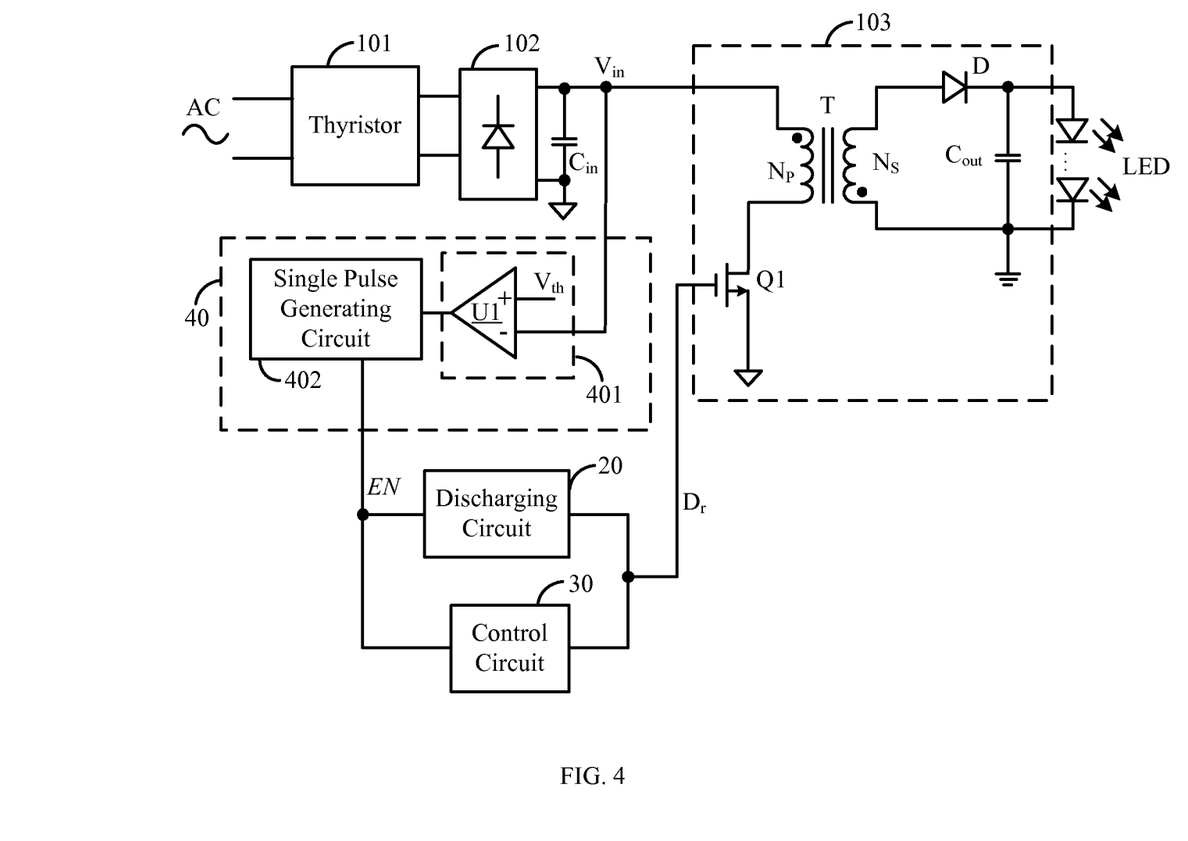
FIG. 4 is a schematic block diagram of a second example thyristor dimming circuit in accordance with embodiments of the present invention.

Referring now to FIG. 4, shown is a schematic block diagram of a second example thyristor dimming circuit in accordance with embodiments of the present invention. In this example, enable signal generating circuit 40 can be used to output enable signal EN for control of discharging circuit 20 and control circuit 30. In this particular example, a flyback topology including thyristor 101, rectifier bridge 102, and power stage circuit 103 is shown; however, other converter topologies and/or arrangements can be employed in particular embodiments.

Enable signal generating circuit 40 can include comparison circuit 401 and single pulse generating circuit 402. Comparison circuit 401 can compare phase-loss input voltage $V_{in}$ against threshold signal $V_{th}$, and may output a pulse signal according to the comparison result. Single pulse generating circuit 402 can receive the pulse signal from comparison circuit 401, and may accordingly output enable signal EN based on the pulse signal.

Comparison circuit 401 can include comparator U1 having a non-inverting input terminal to receive threshold signal $V_{th}$, and an inverting input terminal to receive phase-loss input voltage $V_{in}$. For example, threshold signal $V_{th}$ can be less than a maximum value of phase-loss input voltage $V_{in}$, and greater than phase-loss input voltage $V_{in}$ corresponding to when the input current equals the holding current of thyristor 101. Thus, the value of threshold signal $V_{th}$ can correspond to the start time of the second predetermined time interval. In addition, the pulse width output from single pulse generating circuit 402 (e.g., enable signal EN) can correspond to the duration of the second predetermined time interval.

Figure 5:
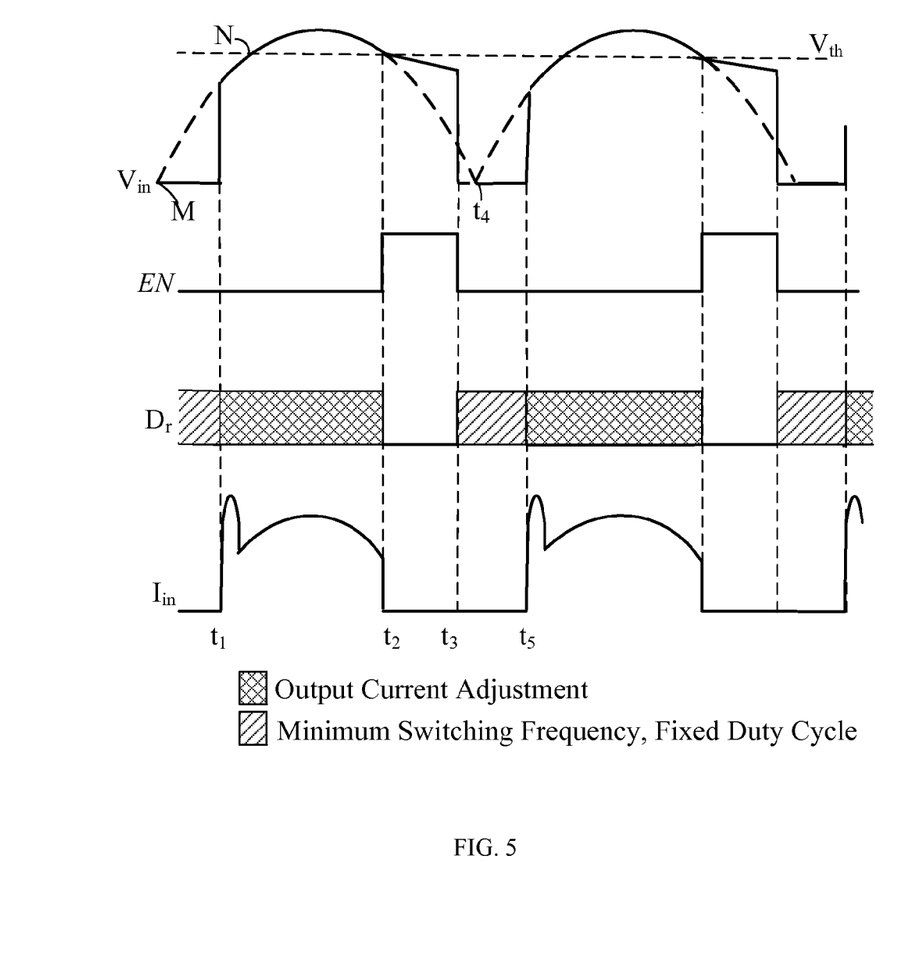
FIG. 5 is an operation timing diagram of a thyristor dimming circuit with a lossless discharging circuit, in accordance with embodiments of the present invention.

Referring now to FIG. 5, shown is an operation timing diagram of a thyristor dimming circuit with a lossless discharging circuit, in accordance with embodiments of the present invention. During the example circuit of FIG. 4 in conjunction with the waveform diagram of FIG. 5, example operation of a thyristor dimming circuit with a lossless discharging circuit of particular embodiments will be described.

At time $t_1$, thyristor 101 can be turned on, and the input voltage of power stage circuit 103 can be phase-loss input voltage $V_{in}$. Also, enable signal EN can be low. At this time, control circuit 30 can control main switch Q1 such that the dimming circuit can output a substantially constant current to drive the LED load. Thus in this case, enable signal EN being low may enable control circuit 30 to control main switch Q1.

At time $t_2$, when phase-loss input voltage $V_{in}$ is reduced to a level of threshold signal $V_{th}$, the second predetermined time interval may begin. Here, comparison circuit 401 can output a high level at enable signal EN. Also, single pulse generating circuit 402 can be utilized to extend enable signal EN for a predetermined duration. That is, from $t_2$ to $t_3$, enable signal EN can be high, and main switch Q1 can be turned off by way of control signal $D_r$ being low. Because main switch Q1 is off, input current $I_{in}$ can be zero and thyristor 101 can be turned off.

Because threshold signal $V_{th}$ can be higher than the corresponding phase-loss input voltage $V_{in}$ when the current of thyristor 101 equals the holding current of the thyristor circuit, thyristor 101 can be turned off before input current $I_{in}$ is reduced to the holding current of the thyristor. This can ensure that the load current is higher than the holding current of thyristor 101 during the conduction or on time of the thyristor, in order to avoid possible LED flashing that might be caused by mis-conduction (e.g., inadvertent turn on/off, leakage, etc.) of the thyristor.

From time $t_3$ before the absolute value of the sinusoidal AC voltage is reduced to zero (time $t_4$), enable signal EN can go low, and discharging circuit 20 can control main switch Q1 to operate at a minimum switching frequency with a fixed duty cycle. This can provide a current charging loop for thyristor 101 from time $t_4$ to time $t_5$ prior to the next dimming cycle in order to ensure the thyristor is successfully turned on. Then, input voltage $V_{in}$ can be reduced to zero, and input current $I_{in}$, can remain zero, keeping thyristor 101 off. Also, switching losses of main switch Q1 can be negligible as input current $I_{in}$, is zero at this time.

From time $t_5$, the thyristor can be turned on, discharging circuit 20 may be disabled, and control circuit 30 can control main switch Q1. Thus, in this example, discharging circuit 20 and control circuit 30 may be alternatively enabled. In this way, a repeating cycle is formed from time $t_1$ to time $t_5$ as shown. Also, when comparator U1 is configured as comparison circuit 401, during the time interval from point M to point N, comparator U1 may output a high level.

Figure 6:
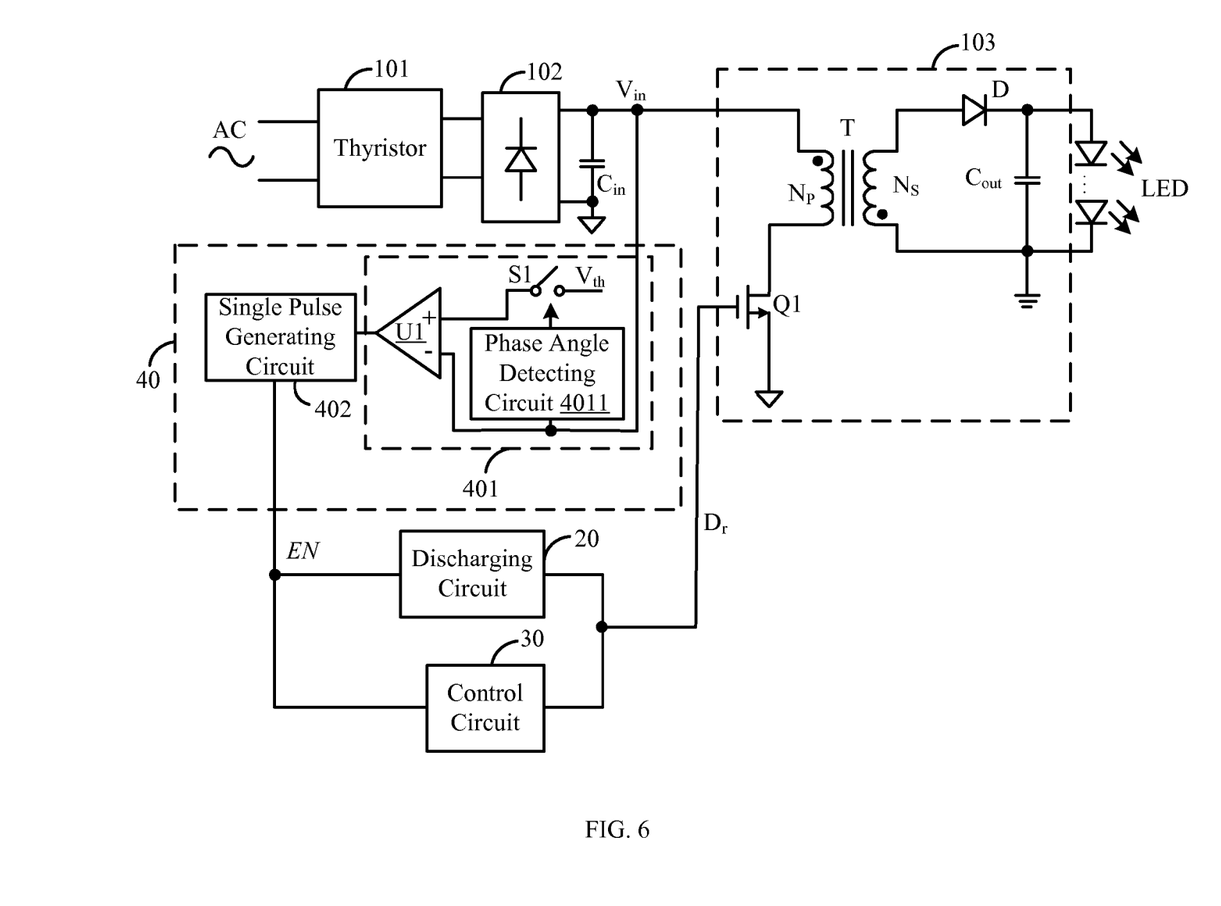
FIG. 6 is a schematic block diagram of a third example thyristor dimming circuit in accordance with embodiments of the present invention.

Referring now to FIG. 6, shown is a schematic block diagram of a third example thyristor dimming circuit in accordance with embodiments of the present invention. In order to ensure that enable signal EN remains effective during the second predetermined time interval, enable signal generating circuit 40 can also include phase angle detecting circuit 4011 and switch S1 in comparison circuit 401. For example, this configuration can be utilized to control comparison circuit 401 to output a high level when the angle of phase-loss input voltage $V_{in}$ is in a predetermined range (e.g., between about 90° and about 180°).

Switch S1 can connect between threshold signal $V_{th}$ and the non-inverting input terminal of comparator U1. Correspondingly, an input terminal of phase angle detecting circuit 4011 can receive phase-loss input voltage $V_{in}$, and an output of phase angle detecting circuit 4011 can connect to a control terminal of switch S1. For example, phase angle detecting circuit 4011 can output a square wave signal according to angle information of phase-loss input voltage $V_{in}$. In one case, when the square wave signal is active high, switch S1 can be turned on, and another terminal of switch S1 can output threshold signal $V_{th}$. In this particular example, the square wave signal can be defined to be active high when the phase angle of phase-loss input voltage $V_{in}$ is equal or greater than about 90° and less than about 180°. Also, the square wave signal can remain low when the phase angle of phase-loss input voltage $V_{in}$ is between about 0° and about 90°.

It should be noted that the connection relationship of phase angle detecting circuit 4011, switch S1, and comparator U1 can be adjusted. For example, switch S1 can connect with the output terminal of comparator U1 to determine if the comparator can output a pulse signal. Those skilled in the art will recognize that other circuit configurations, arrangements, and/or components can be utilized in comparison circuit 401. In addition, a dimming circuit provided in particular embodiments can be applied in any suitable switching power supply. For example, the power stage circuit can be implemented including connecting a magnetic component with a power switch in a suitable topology (e.g., a forward converter, a buck converter, a flyback converter, a boost converter, a buck-boost converter, etc.).

In one embodiment, a thyristor dimming method can include: (i) generating a phase-loss input voltage from a sinusoidal AC voltage by a thyristor and a rectifier bridge; (ii) driving a lamp load through electrical conversion of the phase-loss input voltage by a power stage circuit; and (iii) during a first predetermined time interval, controlling a main switch of the power stage circuit to operate with a fixed duty cycle at a fixed frequency, the first predetermined time interval beginning prior to the absolute value of the sinusoidal AC voltage being reduced to zero, the first predetermined time interval ending when the phase-loss input voltage is again applied to the power stage circuit.

Figure 7:
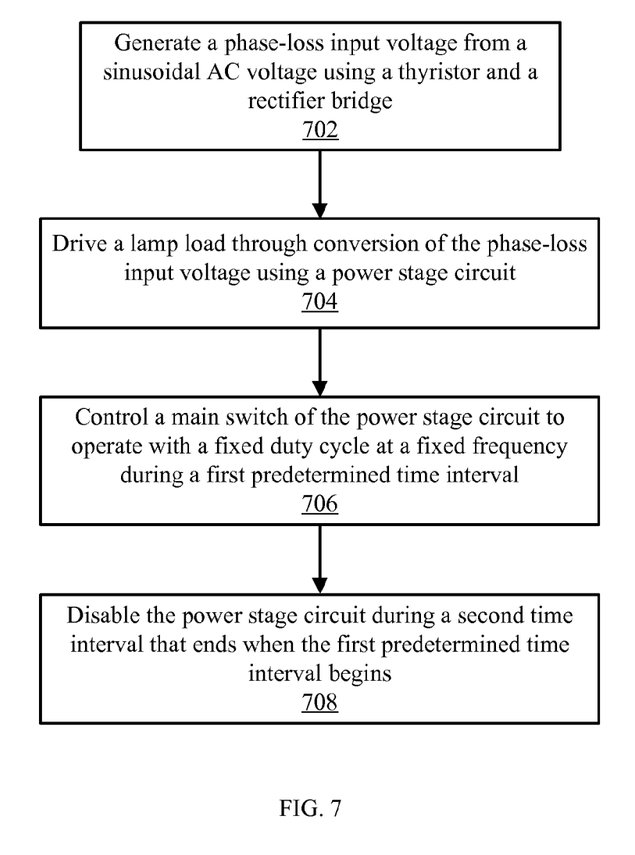
FIG. 7 is a flow diagram of an example thyristor dimming method in accordance with embodiments of the present invention.

Referring now to FIG. 7, shown is a flow diagram of an example thyristor dimming method in accordance with embodiments of the present invention. At 702, a phase-loss input voltage can be generated by processing a sinusoidal AC voltage by a thyristor and a rectified bridge. At 704, a lamp (e.g., LED) load can be driven through electrical conversion by a power stage circuit. At 706, during a first predetermined time interval, a main switch of the power stage circuit can be controlled to operate with a fixed duty cycle at a fixed frequency, so as to provide a current charging loop for a thyristor circuit.

For example, the first predetermined time interval can start at the moment before the absolute value of the sinusoidal AC voltage is reduced to zero, and end at the moment when the phase-loss input voltage is again applied to the power stage circuit. At 708, the example control method can include disabling the power stage circuit during a second predetermined time interval. For example, the second predetermined time interval can start at the moment before an input current of the power stage circuit is reduced to a holding current of the thyristor circuit, and may end at the beginning of the first predetermined time interval.

For example, the fixed frequency can be configured as the minimum switching frequency of the main switch (e.g., transistor Q1). Further, the thyristor dimming method can also include generating an enable signal. The enable signal can be generated by comparing the phase-loss input voltage against a threshold signal, and outputting a pulse signal in accordance with a comparison result. For example, the threshold signal can be less than the maximum value of the phase-loss input voltage, and greater than the corresponding phase-loss input voltage when the input current of the power stage circuit equals the holding current of the thyristor circuit.

The thyristor dimming method can also include determining whether to receive the threshold signal. For example, the threshold signal may not be received when the phase of the phase-loss input voltage is between about 0° and about 90°, and the threshold signal can be received (e.g., via switch S1) when the phase of the phase-loss input voltage is equal to or greater than about 90° and less than about 180°.

In this way, particular embodiments can provide a thyristor dimming circuit with a lossless discharging circuit for generating a phase-loss input voltage after processing a sinusoidal AC voltage by a thyristor and a rectified bridge, and to drive a lamp load through electrical conversion by a power stage circuit. During a first predetermined time interval, a current charging loop can be provided for a thyristor circuit by using a discharging circuit to control a main switch of a power stage circuit. An enable signal may be disabled before an input current is reduced to a holding current of the thyristor, and can remain in this state during a second predetermined time interval. This can ensure that a load current remains higher than the holding current during the conduction time of the thyristor, in order to avoid possible LED flashes or flickering that might otherwise be caused by mis-conduction of the thyristor.

The embodiments were chosen and described in order to best explain the principles of the invention and its practical applications, to thereby enable others skilled in the art to best utilize the invention and various embodiments with modifications as are suited to the particular use contemplated. It is intended that the scope of the invention be defined by the claims appended hereto and their equivalents.

What is claimed is:

1. A thyristor dimming circuit, comprising:
  a) a thyristor and a rectifier bridge configured to receive a sinusoidal AC voltage, and to generate a phase-loss input voltage;
  b) a power stage circuit configured to have said phase-loss input voltage applied thereto, said power stage circuit having a main switch and being configured to drive a lamp load through electrical conversion; and
  c) a discharging circuit configured, during a first predetermined time interval, to control said main switch to operate with a fixed duty cycle at a fixed frequency, wherein said first predetermined time interval begins prior to an absolute value of said sinusoidal AC voltage being reduced to zero, said first predetermined time interval ending when said phase-loss input voltage is again applied to said power stage circuit.

2. The thyristor dimming circuit of claim 1, wherein:
  a) said power stage circuit is configured to be disabled during a second predetermined time interval; and
  b) said second predetermined time interval begins prior to an input current of said power stage circuit being reduced to a holding current of said thyristor, said second predetermined time interval ending when said first predetermined time interval begins.

3. The thyristor dimming circuit of claim 2, further comprising:
  a) an enable signal generating circuit configured to generate an enable signal for a control circuit and said discharging circuit, wherein said enable signal generating circuit comprises a comparison circuit and a single pulse generating circuit;
  b) said comparison circuit being configured to compare said phase-loss input voltage against a threshold signal, and to output a pulse signal in accordance with a comparison result, wherein said threshold signal is less than a maximum value of said phase-loss input voltage, and greater than the phase-loss input voltage when said input current of said power stage circuit equal said holding current of said thyristor; and
  c) said single pulse generating circuit being configured to receive said pulse signal, and to output said enable signal, wherein a pulse width of said enable single corresponds to a duration of said second predetermined time interval.

4. The thyristor dimming circuit of claim 3, wherein said enable signal generating circuit further comprises:
  a) a first switch coupled between said threshold signal and an input terminal of said comparison circuit; and
  b) a phase angle detecting circuit configured to receive said phase-loss input voltage, and to turn said first switch off when a phase of said phase-loss input voltage is between about 0° and about 90°, and to turn said first switch on when said phase of said phase-loss input voltage is equal to or greater than about 90° and less than about 180°.

5. The thyristor dimming circuit of claim 1, wherein said fixed frequency is configured as a minimum switching frequency of said main switch.

6. A thyristor dimming method, comprising:
  a) generating a phase-loss input voltage from a sinusoidal AC voltage by a thyristor and a rectifier bridge;
  b) driving a lamp load through electrical conversion of said phase-loss input voltage by a power stage circuit; and
  c) during a first predetermined time interval, controlling a main switch of said power stage circuit to operate with a fixed duty cycle at a fixed frequency, said first predetermined time interval beginning prior to the absolute value of said sinusoidal AC voltage being reduced to zero, said first predetermined time interval ending when said phase-loss input voltage is again applied to said power stage circuit.

7. The method of claim 6, further comprising disabling said power stage circuit during a second predetermined time interval that starts prior to an input current of said power stage circuit being reduced to a holding current of said thyristor, and ends when said first predetermined time interval begins.

8. The method of claim 6, wherein said fixed frequency is configured as a minimum switching frequency of said main switch.

9. The method of claim 6, further comprising:
  a) comparing said phase-loss input voltage against a threshold signal, and outputting a pulse signal in accordance with a comparison result, wherein said threshold signal is less than a maximum value of said phase-loss input voltage, and greater than said phase-loss input voltage when an input current of said power stage circuit equals said holding current of said thyristor; and
  b) generating an enable signal in response to said pulse signal.

10. The method of claim 9, further comprising:
  a) receiving said phase-loss input voltage in a comparator when a phase of said phase-loss input voltage is between about 0° and about 90°; and
  b) receiving said threshold signal and said phase-loss input voltage in said comparator when said phase of said phase-loss input voltage is equal to or greater than about 90° and less than about 180°.

* * * * *